3,029,176
APPARATUS FOR ASSEMBLING A THREE COMPONENT CLOSURE INTO A UNITARY ASSEMBLY
Charles D. Schoonmaker, Paramus, N.J., assignor to King Container Corporation, Rockaway, N.J., a corporation of New Jersey
Filed Oct. 21, 1959, Ser. No. 847,822
3 Claims. (Cl. 156—362)

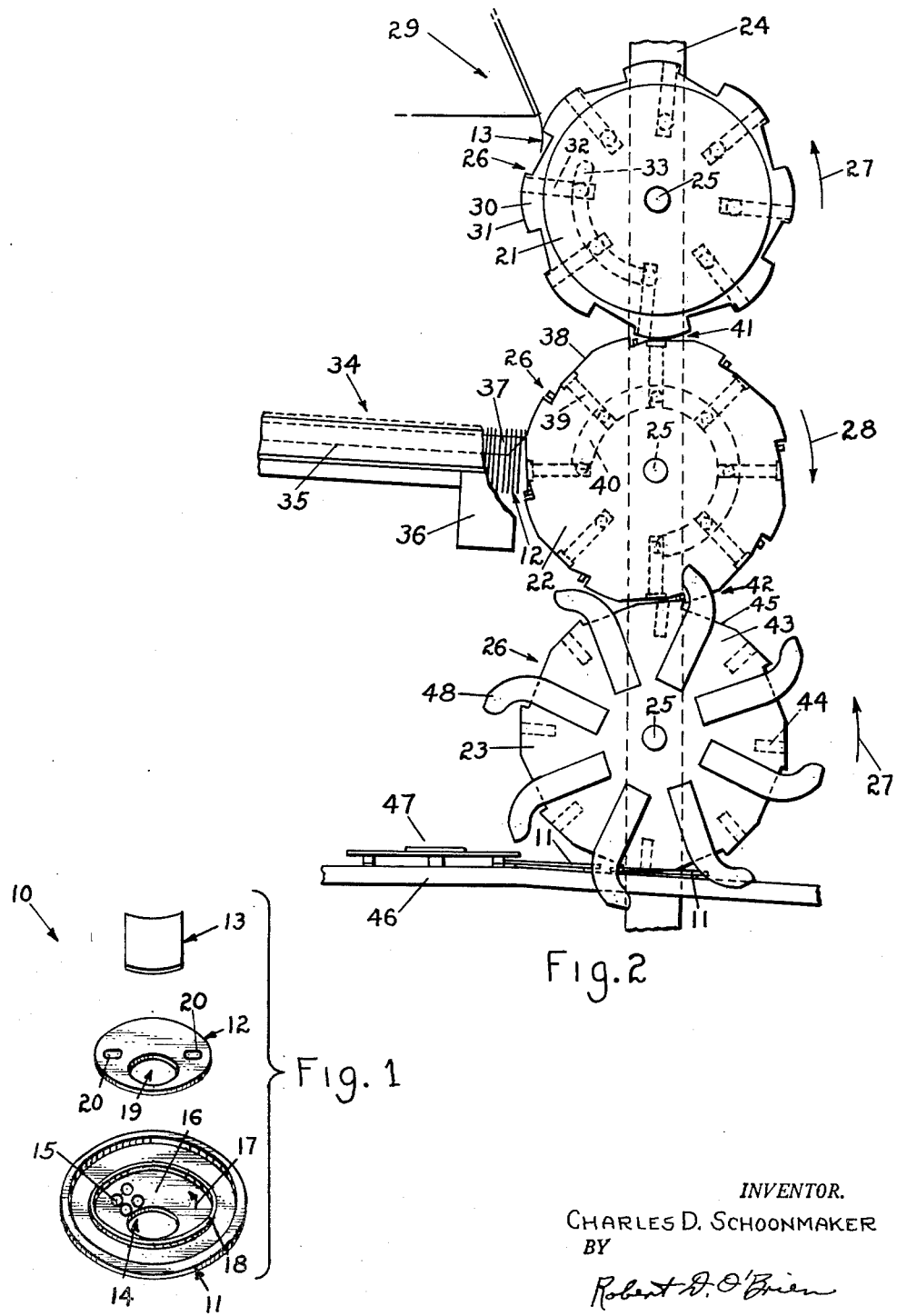

This invention broadly relates to an apparatus and method for assembling a closure member. More particularly this invention relates to a method and apparatus for assembling the individual components comprising a closure member for a hollow container in which each component is individually and sequentially fed to the machine to be combined in proper relationship to the other parts.

Heretofore, the conventional closures consisting of swivel members, can ends and adhesive members had to be assembled by hand. This was a costly method and with frequent misalignment of one of the parts often resulted in spoiling of the finished closure.

The primary object of the present invention therefore is to provide a method and apparatus to continuously assemble the adhesive sealing members, rotating swivel or dredge members and container ends into complete units capable of attachment onto a hollow container.

It is another object of the present invention to provide an efficient and economical method and apparatus for combining the aforementioned components to overcome the deficiencies of hand assembling procedures.

Other objects and advantages of the invention will become more apparent during the course of the following description when taken in connection with the accompanying drawings.

In the drawings wherein like numerals are employed to designate like parts throughout the same:

FIG. 1 is an exploded perspective view of the individual components constituting the closure member before assembly; and FIG. 2 is a side elevation of the apparatus of the present invention.

According to the present invention there is provided a continuous system for assembling three individual components in timed relationship wherein each component is individually fed into the apparatus and joined in proper relationship to the other components so as to emerge from the apparatus in completely assembled form.

Turning now to FIG. 1 there is shown the three component closure member 10, including base member 11, a swivel member 12 and a pressure sensitive sealing or adhesive member 13. Since the present invention relates to the method of assembling these components only those structural details of the three components believed necessary for a complete understanding of the present invention will be hereinafter described.

The base member 11 has a pouring opening 14 and a sifting opening 15 formed into the portion 16 of the base member 11 within the recess 17, which recess is defined and enclosed by raised shoulder 18.

The swivel member 12, the diameter of which is substantially the same as the diameter of recess 17, has a single opening 19 and two raised knobs 20 used to rotate the member 12 when it is seated in recess 17. Access to the contents of the container, after the top closure unit 10 is sealed onto the container, is gained by rotating the member 12 until the opening 19 is aligned with either of openings 14 or 15.

The sealing member 13 is formed of a flexible tape, with at least one side of member 13 having a sealing adhesive material thereon. Member or sealing tape 13 is mounted onto the member 12 so as to close opening 19 and also to contact the area of portion 16, through opening 19 after assembly, not perforated by openings 14 or 15. This will prevent rotation of member 12 with respect to member 11, after assembly of the top closure unit 10 and effectively seals the top against accidental spilling of the container contents. When tape 13 is removed the swivel 12 can be rotated and access gained to the container whereby the contents of the container may be dispensed.

Therefore having above briefly described the unit to be assembled, let us turn to FIG. 2 and to the method and apparatus for assembling the top closure unit 10 itself.

Three rotating wheels or drums 21, 22 and 23 are mounted on a suitable frame 24 in vertical alignment. The rotating axes 25 of these wheels are vertically spaced so as to allow bearing contact between the closure parts carried on the rotating peripheries of adjacent wheels. The periphery 26 of each wheel is contoured or machined so that this contact is maintained, over the surface of the variously shaped parts of the wheels carrying the components of the closure, where the peripheries of the wheels meet so that said peripheries define a tortuous path along which said adhesive member 13 and said swivel member 12 pass during the course of the assembly of the top closure unit 10 to be described as the specification proceeds. The contours are also designed to facilitate the individual feed of the individual parts to each respective wheel and to prevent pressure contact between the wheels where such pressure is not desired.

Upper and lower wheels 21 and 23 rotate in the same direction, i.e. in the direction of arrows 27 whereas the center wheel 22 rotates in a counterdirection, i.e. in the direction of arrow 28. This permits the linear transfer of the peripheral conveyed parts carried by one wheel onto the adjacent wheel. A suitable motor, not shown, is provided to drive each wheel so that they are traveling at the same speed at these points of contact.

Adjacent the upper wheel 21 is a tape feed means 29 provided to intermittently feed from a continuous roll supply a sealing member 13 onto each convexly equispaced contoured lug 30 on wheel 21 with the adhesively coated side of member 13 facing outwardly. Each pressure sensitive sealing member 13 is picked up and held flush against the surface 31 of lug 30 by means of a suction applied through conduit 32 from a central source 33. Thus, the pressure sensitive sealing members 13 are carried on the contoured periphery 26 of wheel 21 in the direction of arrow 27 towards wheel 22.

Positioned adjacent center wheel 22 is swivel feed means 34. This means 34 includes a tube or rod 35, passing through opening 19 in members 12, and a permanent magnet 36 at the delivery end 37 of rod 35. This magnet 36 acts to separate members 12, and to facilitate this, the rod 35 may be inclined slightly with respect to the horizontal. The members 12 are picked up, transferred to and secured to one of the equi-spaced ledges 38 on periphery 26 of wheel 22 by suction applied through conduits 39 fed from central source 40. As these swivels 12 move upwardly in the direction of arrow 28, they come into bearing contact with member 13 carried by wheel 21 at the contact point 41 between the peripheries 26 of the two wheels 21, 22 the two members 12 and 13 meet. At this point the vacuum source 33 terminates, as seen in FIG. 2, and the adhesive on member 13 causes the member 13 to attach itself to the surface of member 12. Since the rod 35 causes the member 12 to be placed onto wheel 22 in a controlled manner, this tape member 13 will be deposited in registry with the member 12 and will cover the opening 19.

Thus proper registry between the two members so joined is assured.

As wheel 22 continues to rotate towards wheel 23 it carries with it a two piece unit, i.e. a swivel 12 and a sealing member 13 joined one to the other and as the specification proceeds, this two piece unit composed of the swivel member 12 and the adhesive or pressure sensitive sealing member 13 shall be referred to as the adhesive-swivel unit 12—13. As this two piece unit comes to the meeting point 42 between wheels 22 and 23, the vacuum source 40 of wheel 22 is terminated and the two piece unit is transferred onto one of the equi-spaced ledges 43 of wheel 23, by means of permanent magnets 44 inset into wheel 23. At this time the seal member 13 rests against surface 45 of a ledge 43.

As the wheel 23 continues to rotate a series of end or base members 11 are conveyed along a belt 46 directly below wheel 23, suitably spaced from one another with seating recess 17 facing upwardly. A conventional timer 47 is provided adjacent the path of belt or conveyor 46 to feed these base units 11 under wheel 23 in timed spaced relationship.

A plurality of arms 48 are affixed to wheel 23 in aligned pairs one on each side of the wheel. These arms 48 pick up each base member 11 and carry it positively into position where recess 17 (FIG. 1) will receive a two piece adhesive swivel unit 12, 13. The adhesive swivel units 12, 13 are removed from wheel 23, over the holding action of magnets 44 because the lead edge of each swivel 12 is gripped by the shoulder 18 of recess 17 and slightly wedged thereagainst as wheel 23 rotates. This separation of adhesive-swivel unit 12—13 from the periphery of drum or wheel 23 follows because in the embodiment shown, the magnets 44 have a minimum magnetic strength and in fact, just sufficient enough to overcome the weight of an adhesive-swivel unit 12—13. Thus, the slight interference of shoulder 18, is, in and of itself, sufficient to interrupt the magnetic attraction between swivel member 12 and magnets 44 thus allowing adhesive-swivel member 12—13 to fall freely and away from drum 23. There are of course other suitable mechanical means that can be used; for example, a secondary magnet, having greater magnetic attractive force than magnet 44 for member 12, could be placed below conveyor 46 to achieve a more direct and positive release of the adhesive-swivel unit 12—13 from drum 23 and into recess 17 of the base member 11. The arms 48 then positively push the assembled adhesive swivel unit 10 along conveyor 46, the adhesive swivel unit being now assembled. Mounted along the further path of the conveyor 46 would be a conventional sealing machine (not shown) to bump shoulder 18 so that the adhesive swivel unit 12, 13 could not later be disengaged from end member 11.

Therefore there has been provided a continuous and endless system wherein the individual components constituting a closure for a hollow container may be assembled together efficiently and in a manner affording important advantages over the methods and apparatus previously used.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. A machine as defined for assembling into unitary assembly a three component container closure composed of a base member having a seating recess, a swivel member and an adhesive member having an adhesive coating on at least one surface, including: a conveyor moving the base member with the seating recess on the upwardly directed surface along a definite path, means for assembling the swivel member and the adhesive member into an adhesive-swivel unit, means for passing said adhesive-swivel unit along a definite path to bring said adhesive-swivel unit into an opposed position with respect to said base member and means for synchronizing the movement of said base member with respect to said adhesive-swivel unit and to force said adhesive swivel unit into the seating recess in said base member, said unit assembly means including a plurality of rotating drums, the peripheries of which define a tortuous path along which said adhesive member and said swivel member pass during the course of their assembly.

2. A machine as defined in claim 1, wherein said drums each include securing means to retain said members in engagement with their peripheries and means releasing said securing means when a member is to be disengaged from the periphery of one of said drums.

3. A machine for assembling into unitary assembly a three component container closure composed of a base member having a seating recess, a swivel member and an adhesive member, having an adhesive coating on at least one surface, including a first rotating drum, means for feeding individually each adhesive member onto said first drum with the adhesive surface facing outwardly, a second rotating drum, means for feeding individually each swivel member onto said second drum, a third rotating drum, means for mounting said rotating drums, said drum mounting means mounting said first and said second drums to place the periphery of said first drum adjacent the periphery of said second drum to effect contact between the adhesive member, carried by said first drum, and the swivel member, carried by said second drum, means for securing said adhesive member to the periphery of said first drum, means for securing said swivel member to the periphery of said second drum, means for releasing said adhesive member securing means on said first drum when contact is made between said adhesive member and said swivel member to effect the transfer of the adhesive member from said first drum onto said swivel carried on the periphery of said second drum to form an adhesive-swivel unit, said drum mounting means further mounting said third drum to place the periphery of the third drum adjacent the periphery of said second drum and to effect contact between the periphery of said third drum and an adhesive-swivel unit carried on the periphery of said second drum, means for releasing said swivel member securing means on said second drum when contact is made between said adhesive-swivel unit and the periphery of said third drum, means to effect transfer of said adhesive-swivel unit onto said third drum, means for securing said adhesive-swivel unit onto the periphery of said third drum, means for passing a plurality of individual base members along a substantially horizontal path below said third drum, the seating recess of each base member facing upwardly toward said third drum, said last-mentioned means carrying said base member into engagement with said adhesive-swivel unit on said third drum and means for effecting a transfer of said adhesive-swivel unit from said third drum into the recess of said base member passing therebelow and overcoming the securing force tending to hold said adhesive-swivel onto said third drum.

References Cited in the file of this patent

UNITED STATES PATENTS

| | | |
|---|---|---|
| 1,877,153 | Walter | Sept. 13, 1932 |
| 2,152,270 | Nyden | Mar. 28, 1939 |
| 2,497,212 | Donofrio | Feb. 14, 1950 |
| 2,505,412 | Law | Apr. 25, 1950 |
| 2,776,787 | Nicol | Jan. 8, 1957 |
| 2,895,551 | Anderson et al. | July 21, 1959 |
| 2,969,895 | Rucki | Jan. 31, 1961 |